United States Patent
Kanamarlapudi et al.

(10) Patent No.: US 12,069,748 B2
(45) Date of Patent: Aug. 20, 2024

(54) ROBUST COMPATIBILITY MODE COMMUNICATION

(71) Applicant: QUALCOMM Incorporated, San Diego, CA (US)

(72) Inventors: Sitaramanjaneyulu Kanamarlapudi, San Diego, CA (US); Ozcan Ozturk, San Diego, CA (US); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 208 days.

(21) Appl. No.: 17/449,627

(22) Filed: Sep. 30, 2021

(65) Prior Publication Data
US 2023/0102950 A1  Mar. 30, 2023

(51) Int. Cl.
  *H04W 76/10*  (2018.01)
  *H04W 8/24*  (2009.01)
  *H04W 88/02*  (2009.01)

(52) U.S. Cl.
  CPC .......... *H04W 76/10* (2018.02); *H04W 8/24* (2013.01); *H04W 88/02* (2013.01)

(58) Field of Classification Search
  CPC ....... H04W 76/10; H04W 8/24; H04W 88/02; H04W 48/10
  See application file for complete search history.

(56) References Cited

U.S. PATENT DOCUMENTS

2022/0386108 A1* 12/2022 Venkataraman ...... H04W 76/16
2023/0139024 A1*  5/2023 Chang ................... H04W 48/16
                                                          370/329

OTHER PUBLICATIONS

Huawei et al: "Updated views on R18 Robust Compatibility Mode", 3GPP Draft; RP-212292, 3rd Generation Partnership Project (3GPP), France, Sep. 2021 (Year: 2021).*
Huawei Etal: "Robust Compatibility Mode Communication in 5G-Advanced", 3GPP Draft; RWS-210452, 3RD Generation Partnership Project (3GPP), France, Jun. 2021 (Year: 2021).*
International Search Report and Written Opinion dated Jan. 5, 2023 from corresponding PCT Application No. PCT/US2022/075077.

(Continued)

*Primary Examiner* — Gary Mui
*Assistant Examiner* — Yewon Kim
(74) *Attorney, Agent, or Firm* — QUALCOMM Incorporated

(57) ABSTRACT

The present disclosure provides systems, devices, apparatus and methods, including computer programs encoded on storage media, for robust compatibility mode communication. A user equipment may determine whether a robust compatibility mode (RCM) is supported between the UE and the base station. The UE also may establish a RCM connection with the base station when the RCM is supported between the UE and the base station. The UE also may receive, from the base station, through the RCM connection, a configuration associated with the RCM. The UE also may update a behavior of the UE for a current situation of the UE based on the configuration. The UE also may transmit, to the base station, a request to access a wireless network with the updated behavior of the UE.

26 Claims, 9 Drawing Sheets

(56) References Cited

OTHER PUBLICATIONS

Huawei et al: "Updated views on R18 Robust Compatibility Mode", 3GPP Draft; RP-212292, 3rd Generation Partnership Project (3GPP), Mobile Competence Centre ; 650, Route Des Lucioles ; F-06921 Sophia-Antipolis Cedex; France, vol. TSG RAN, No. Electronic Meeting; 20210913-20210917 Sep. 6, 2021 (Sep. 6, 2021), XP052049566, Retrieved from the Internet: URL:https://ftp.3gpp.org/tsg_ran/TSG_RAN/TSGR_93e/Docs/RP-212292.zip RP-212292 Updated views on R18 Robust Compatibility Mode.doc [retrieved on Sep. 6, 2021].

Huawei Etal: "Robust Compatibility Mode Communication in 5G-Advanced", 3GPP Draft; RWS-210452, 3rd Generation Partnership Project (3GPP), Mobile Competence Centre; 650, Route Des Lucioles; F-06921 Sophia-Antipolis Cedex; France, vol. TSG RAN, No. Electronic Meeting; 20210628-20210702 Jun. 7, 2021 (Jun. 7, 2021), XP052026004, Retrieved from the Internet: URL:https://ftp.3gpp.org/tsg_ran/TSG_RAN/TSGR_A.Hs/2021_06_RAN_Re118_WS/Docs/RWS-2104 52.zip RWS-210452 Robust Compatibility Mode Communication.doc [retrieved on Jun. 7, 2021].

Huawei: "Email discussion summary for [RAN-R18-WS-crossFunc-Huawei]", 3GPP Draft; RWS-210622, 3rd Generation Partnership Project (3GPP), Mobile Competence Centre; 650, Route Des Lucioles; F-06921 Sophia-Antipolis Cedex; France vol. RAN WG3, No. Electronic Meeting; 20210628-20210702 Jun. 25, 2021 (Jun. 25, 2021), XP052029073, Retrieved from the Internet: URL:https://ftp.3gpp.org/tsg_ran/TSG_RAN/TSGR,_AHs/2021_06_RAN_Re118_WS/Docs/RWS-2106 22.zip RWS-210622 RAN-R18-WS-crossFunc-Huawei.pdf [retrieved on Jun. 25, 2021].

RAN2 Chair (Mediatek): "Moderator's summary for discussion [RAN93e-R18Prep-16] Additional RANI/2/3 candidate topics Set 3", 3GPP Draft; RP-211666, 3rd Generation Partnership Pro.Ject (3GPP), Mobile Competence Centre; 650, Route Des Lucioles; F-06921 Sophia-Antipolis Cedex; France vol. RAN WGI, No. Electronic Meeting; 20210913-20210917 Sep. 3, 2021 (Sep. 3, 2021), XP052047755, Retrieved from the Internet: URL:https://ftp.3gpp.org/tsg_ran/TSG_RAN/TSGR_93e/Inbox/RP-211666.zip RP-211666 RAN93e-R18Prep-16_Additional_RAN1_2_3_candidate_topics_Set_3-v0.0.5 FINAL.pdf [retrieved on Sep. 3, 2021].

\* cited by examiner

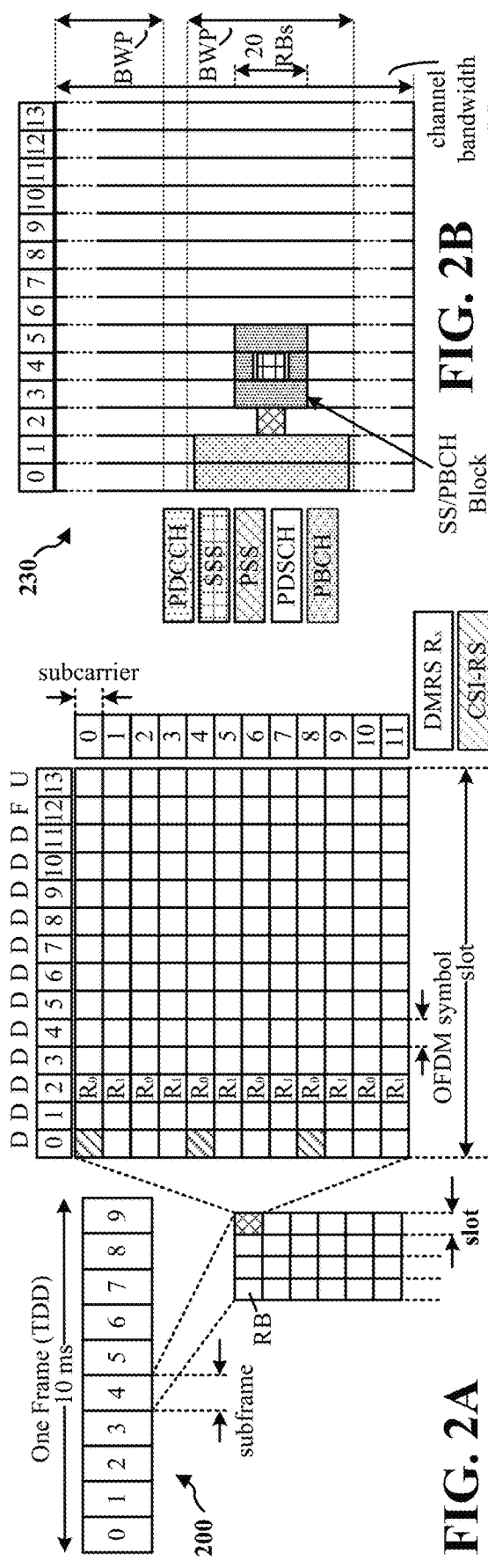
FIG. 2A
FIG. 2B
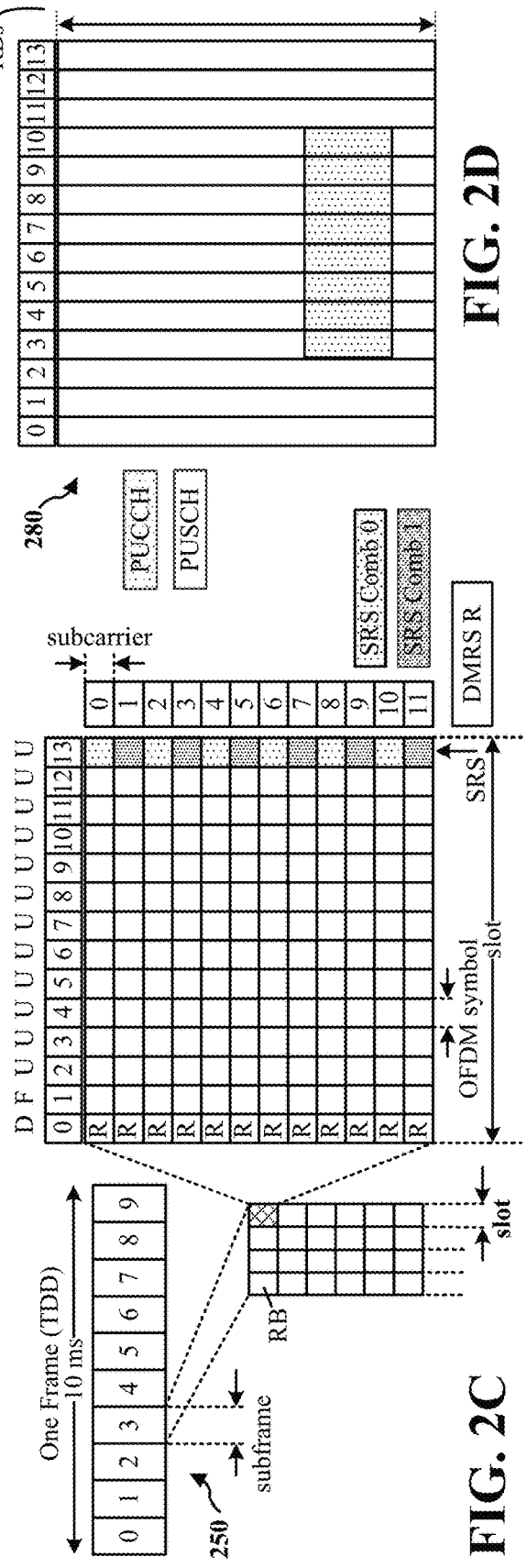
FIG. 2C
FIG. 2D

ROBUST COMPATIBILITY MODE COMMUNICATION

BACKGROUND

Technical Field

The present disclosure relates generally to communication systems, and more particularly, to robust compatibility mode communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device at a UE that includes a memory and at least one processor coupled to the memory. The memory may include instructions that, when executed by the at least one processor, cause the apparatus to determine whether a robust compatibility mode (RCM) is supported between the UE and a base station; establish a RCM connection with the base station when the RCM is supported between the UE and the base station; receive, from the base station, through the RCM connection, a configuration associated with the RCM; update a behavior of the UE for a current situation of the UE based on the configuration; and transmit, to the base station, a request to access a wireless network with the updated behavior of the UE.

In another aspect of the disclosure, a method, a computer-readable medium, and an apparatus are provided. The apparatus may be a wireless device at a base station that includes a memory and at least one processor coupled to the memory. The memory may include instructions that, when executed by the at least one processor, cause the apparatus to transmit, to a user equipment (UE), a system information block comprising an indication of whether a robust compatibility mode (RCM) is supported between the UE and the base station; establish a RCM connection with the UE when the RCM is supported between the UE and the base station; transmit, to the UE, through the RCM connection, a configuration associated with the RCM; and receive, from the UE, a request to access a wireless network with updated behavior of the UE based on the configuration associated with the RCM.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
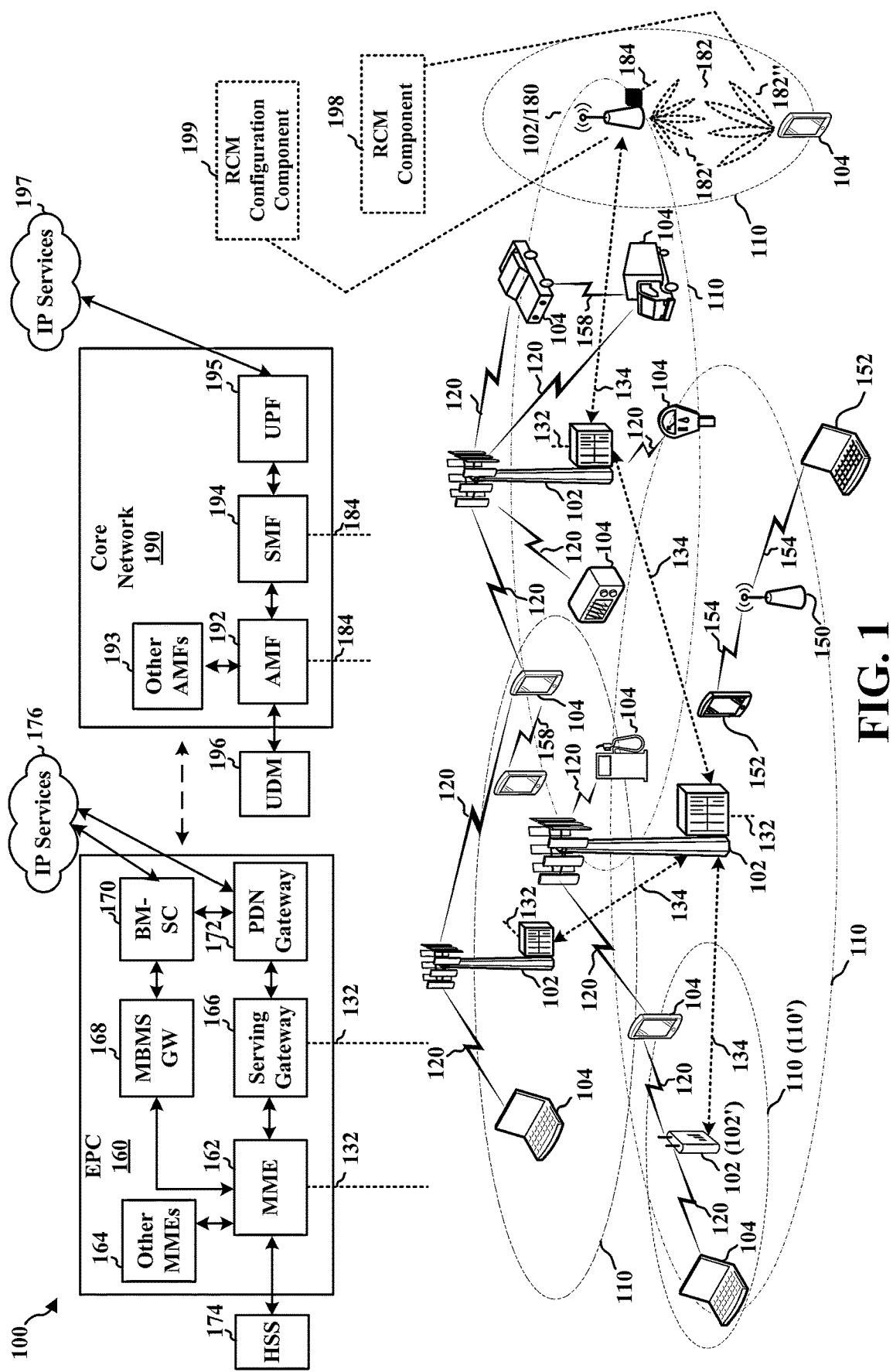
FIG. 1 is a diagram illustrating an example of a wireless communications system and an access network.

Compatibility issues between a user equipment (UE) and network (e.g., base station, core network) can have a significant impact on a new feature roll out as well as user experience. If compatibility issues occur during an initial access stage, the UE may be rendered unusable since it would not be able to establish a basic connection with the network and a communication opportunity with the network can be lost, thus resulting in an adverse user experience.

In some examples, the compatibility issues may occur for multiple reasons. One reason can be that change requests may be introduced to accommodate problematic legacy UEs. For example, some legacy UEs may fail to access the network after a base station is upgraded to support system information broadcasts of a certain type (e.g., system information block type 24 or SIB24). The change request may necessitate legacy UEs operating on a 5G NR network to be upgraded. Another reason can be that the UE or network has inconsistency in implementation due to a variety of reasons. For example, a large number of new product features may be introduced much earlier than real implementation, and some problems with the product features may be found late in the product cycle. In other examples, some legacy UEs with an outdated software version may not adapt correctly to the increase in new product features being deployed.

In some legacy approaches, a network operator can push a software upgrade over-the-air (OTA) to the UE to rectify a relevant compatibility problem. Although upgrading the UE with a most recent (or up-to-date) software version may be a straightforward approach, there may be scenarios where this approach alone may not be sufficient to address the compatibility issue. For example, some products are near end-of-life from a product lifecycle perspective such that manufacturers no longer support software upgrades. In another example, some of the products do not have the capabilities to update via OTA. In other examples, some of the products may be in markets where the issues are specific to local operators; however, not specific to UE vendor software. In still other examples, some of the products may be adversely impacting neighboring components such as a radio by causing signal interference or loading, among others.

The subject technology provides for establishing a safe communication mechanism for problematic UEs via a robust compatibility mode (RCM) using robust communication resources (RCR) when there are compatibility issues occurring between a UE and the network, and ensuring that the UE and the network can resolve compatibility issues through either a UE-based software upgrade or other suitable mechanisms by ensuring the corrective action or feature set compatibility in the network is important to ensure the rollout of different set of features in markets with varying requirements between network readiness and UE availability.

With RCM, the network can ensure that problematic UEs can be addressed without impacting the overall key performance indicators (KPIs) and feature enablement in the network. The RCM can address various original equipment manufacturer (OEM) specific issues, product release specific issues and combinational feature sets due to other compatibility issues.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured determine whether a RCM is supported between the UE and a base station; establish a RCM connection with the base station when the RCM is supported between the UE and the base station; receive, from the base station, through the RCM connection, a configuration associated with the RCM; update a behavior of the UE for a current situation of the UE based on the configuration; and transmit, to the base station, a request to access a wireless network with the updated behavior of the UE (e.g., RCM component 198). In other aspects, the BS 102/180 may be configured to transmit, to UE 104, a system information block comprising the indication of whether the RCM is supported between the UE and the base station; establish a RCM connection with the UE when the RCM is supported between the UE and the base station; transmit, to the UE, through the RCM connection, a configuration associated with the RCM; and receive, from the UE, a request to access a wireless network with updated behavior of the UE based on the configuration associated with the RCM (e.g., RCM configuration component 199). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as Rx for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative acknowledgement (NACK) feedback. The PUSCH carries data, and may additionally be used to carry a buffer status report (BSR), a power headroom report (PHR), and/or UCI.

Figure 3:
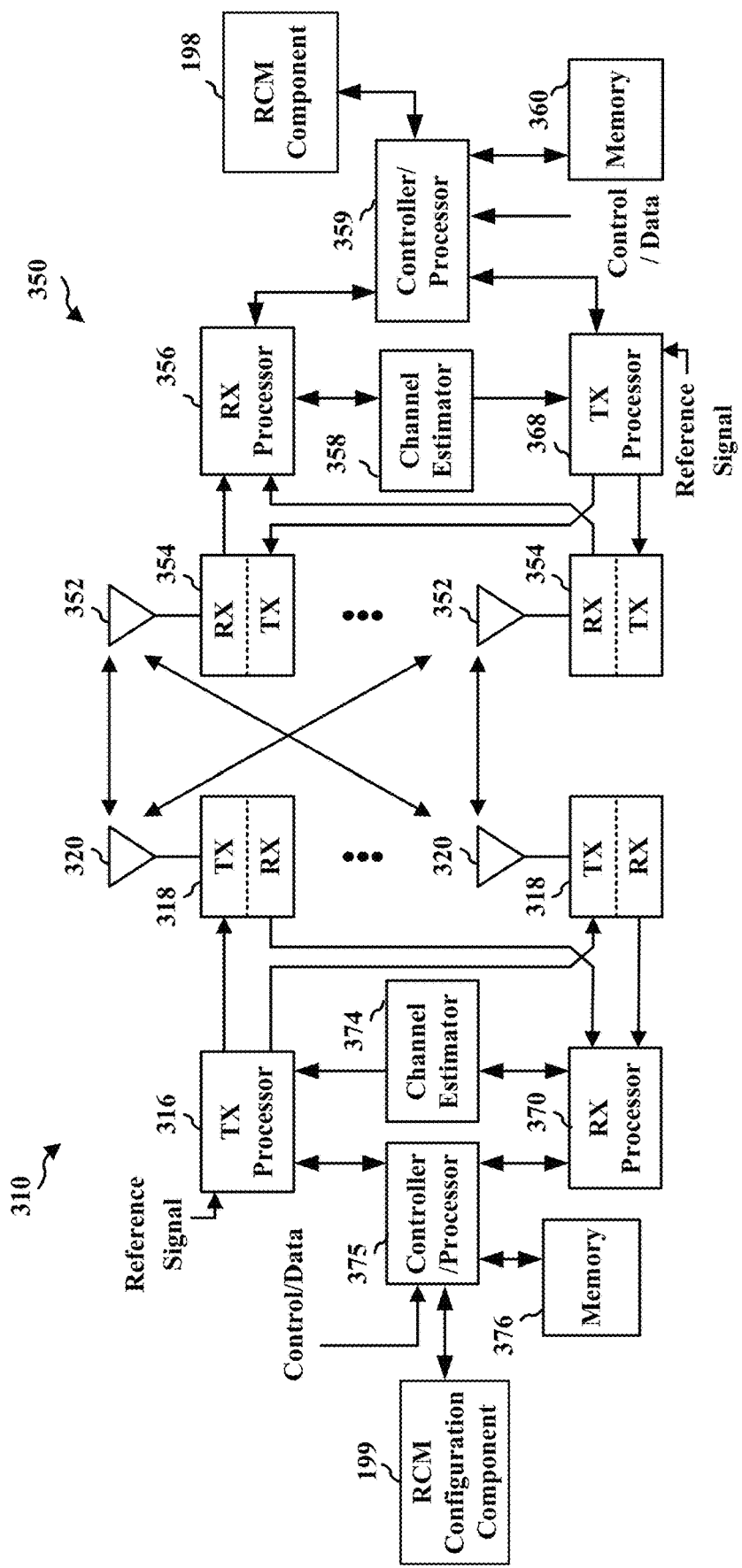
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
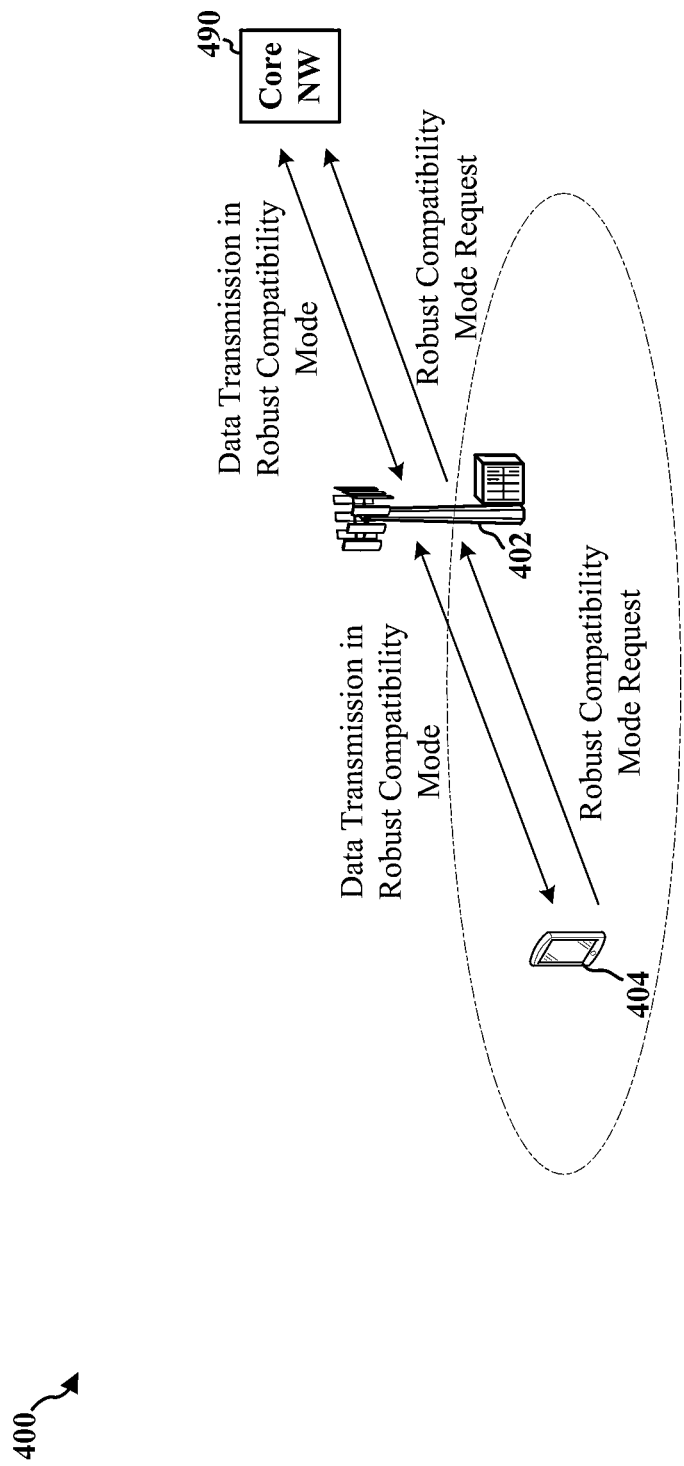
FIG. 4 is a diagram illustrating a robust compatibility mode communication between a UE and network, in accordance with some aspects of the present disclosure.

FIG. 4 is a diagram 400 illustrating a robust compatibility mode communication between a UE 404 and network (e.g., BS 402, core network 490), in accordance with some aspects of the present disclosure. The BS 402 may be similar to the BSs 102, 180 and 310. The UE 404 may be similar to the UEs 104 and 350. The core network 490 may be similar to the core network 190. n legacy approaches for handling compatibility issues between the UE 404 and network (e.g., 402, 490), the UE 404 may have the option to send updated capabilities to the network through a UE assistance information (UAI) message after the initial attach procedure. This functionality allows the UE to have differential behavior based on various situations, such as thermal, power, traffic, memory, or other criteria local to the UE.

The present disclosure provides for the UE 404 to address compatibility issues with the network through a novel signaling procedure with the network. The subject technology can provide for a basic configuration to access a network (e.g., 402, 490) using dedicated resources similar to random access channel (RACH) configuration resources and/or cell selection criteria, which are defined in an industry standard specification.

In the subject technology, the network may indicate whether the network has support capability for RCM and available robust communication resources (RCRs) in a cell when RCM support capability is available. The network may send system information including remaining minimum system information (RMSI). The RMSI can include the RCM support capability indication. As part of the RMSI decoding, either through MIB or SIB1 or other means, the UE 404 can derive the support for robust communication resources and specific resource in the current cell. This resource can be explicitly indicated or uniformly selected out of available. In this regard, such industry standard specification also can define multiple RCRs, which can be either band specific or other criteria specific. These RCRs can be provisioned by a network operator as part of subscription information, such as in a virtual subscriber identity module (SIM) or a physical SIM.

When RCM capability is supported by the network, the UE 404 can establish a RCM connection with the network (e.g., 402, 490) using the RCR resources. In some aspects, the RCM connection between the UE 404 and the network may be different than a regular signaling connection between the UE 404 and the network. In other aspects, the UE 404 may establish the RCM connection to the network through a different communication interface than a regular signaling connection to the network. In some aspects, the UE 404 may send a robust compatibility mode request to the base station 402, which is then forwarded to the core network 490. When the RCM connection is established between the UE 404 and the base station 402, the data transmission between the UE 404 and the base station 402 may be in a robust compatibility mode. Similarly, the base station 402 and the core network 490 may facilitate the data transmission between them in a robust compatibility mode. The network can indicate a network assistance information (NAI) configuration to the UE with validity information through the RCM connection over a downlink channel. In some aspects, the network can send a NAI message on a downlink channel to the UE. The NAI message can indicate feature capabilities to which UE 404 would need to update in a present situation with the network and to continue accessing the network, irrespective of what is reported from the UE perspective. The NAI message can include features that are a subset of the features that the UE already supports. The feature set indicated from the network via the NAI message can be radio access technology (RAT) specific, cell specific, timing advance (TA) specific, public land mobile network (PLMN) specific, operator specific, temporary, or permanent.

The UE 404 can determine which feature capabilities to which the UE needs to update and the UE 404 can update its capabilities with the NAI-based capabilities. In some aspects, the UE 404 may update its capabilities to a limited feature set, where some of the original feature capabilities are disabled or restricted. Based on its new capabilities, the UE 404 can access the network through either a UE capability update procedure or an initial attach procedure. The UE 404 can either continue operating with the new NAI-based capabilities on a temporary basis until the features are requested to be removed (or disabled), or to resume operating with the NAI-based capabilities permanently. For example, the UE 404 can optionally perform a corrective action, such as upgrading to a new software patch that contains the features to which the UE 404 can update and operate with permanently.

Figure 5:
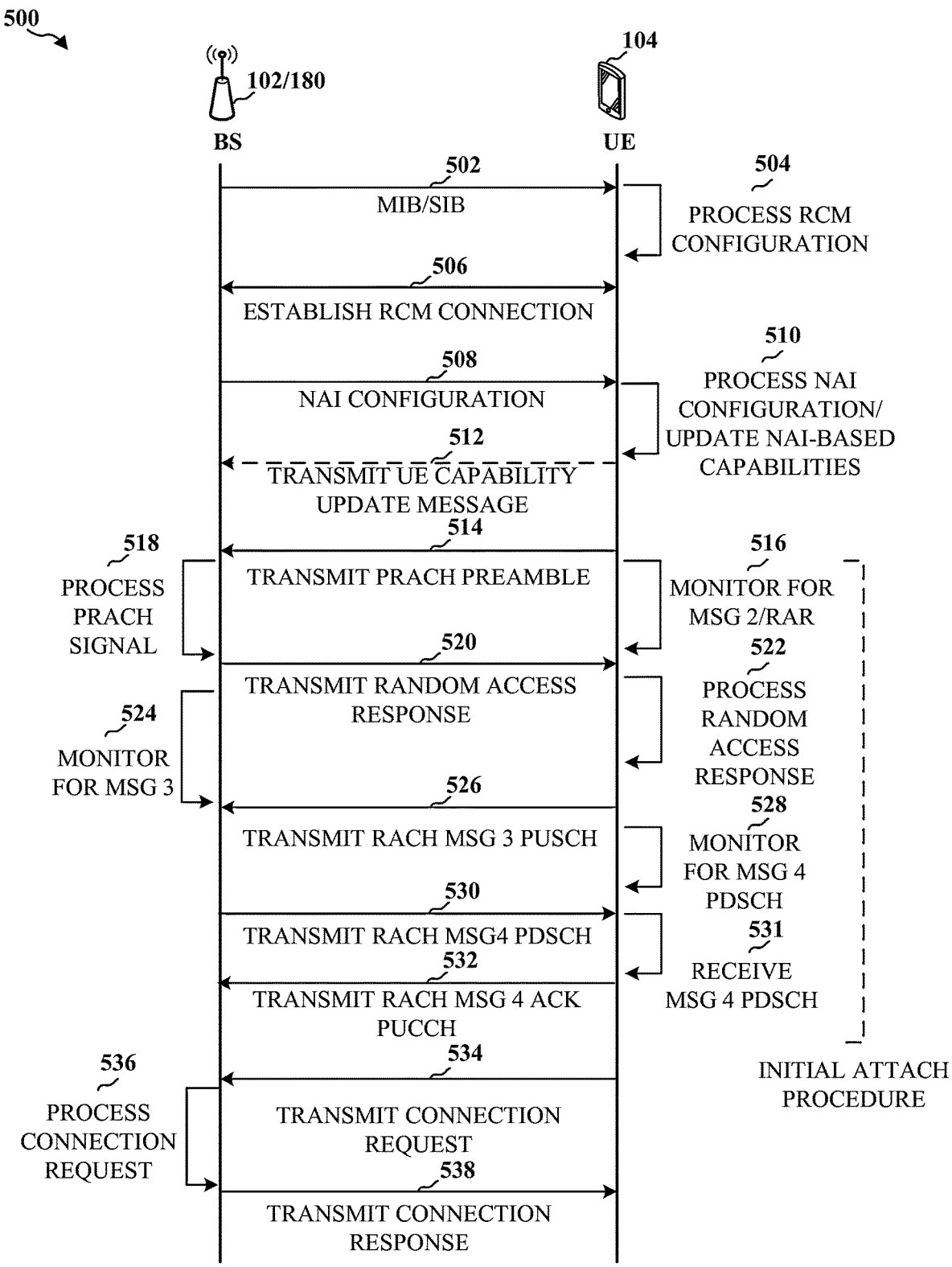
FIG. 5 is a signaling diagram of a robust compatibility mode process, in accordance with some aspects of the present disclosure.

FIG. 5 is a signaling diagram of a robust compatibility mode process 500, in accordance with some aspects of the present disclosure. The process 500 may be implemented among a BS and a UE. The BS may be similar to the BSs 102, 180 and 310. The UE may be similar to the UEs 104 and 350. The process 500 can be executed by computing devices (e.g., a processor, processing circuit, and/or other suitable component) of the BS 102/180 and the UE 104. As illustrated, the process 500 includes a number of enumerated steps, but implementations of the process 500 may include additional steps before, after, and in between the enumerated steps. In some implementations, one or more of the enumerated steps may be omitted or performed in a different order.

At 502, the BS 102/180 transmits system information to the UE 104. In some aspects, the system information may be downlink broadcast information that is transmitted periodically by the BS 102/180. The UE 104 may receive the system information for cell camping when the UE 104 is powered on, for cell selection and/or cell reselection when the UE 104 is in an idle state. The system information may include a master information block (MIB) and one or more system information blocks (SIBs). The system information may include remaining minimum system information (RMSI), which includes a SIB (e.g., SIB Type 1 or SIB1). In some aspects, the MIB may be transmitted via a physical broadcast channel (PBCH) and the SIBs may be transmitted via PDSCH.

The network may indicate whether the network has the capability to support RCM between the UE 104 and the BS 102/180 and available robust communication resources in a cell when RCM support capability is available. The RMSI can include the RCM support capability indication. The RMSI may indicate the robust communication resources in a frequency spectrum and/or time domain.

At 504, the UE 104 may process a RCM configuration. For example, the UE 104 may decode the RMSI and determine whether the network has the capability to support RCM communication between the UE 104 and the BS 102/180. If the network supports RCM, the UE 104 may be able to update its capabilities to features that are needed for the UE 104 to access a wireless network. For example, the network may request the UE 104 to disable one or more features for access to a wireless network in the event that the UE 104 has shown issues accessing and/or connecting to the wireless network. In some examples, the UE 104 may perform a corrective action by performing a software upgrade via the RCM.

In some aspects, at 502, the BS 102/180 may transmit a RACH configuration in a network (e.g., the network 100) to the UE 104. In some implementations, the BS 102/180 may broadcast the RACH configuration in a SIB (e.g., SIB Type 2 or SIB2). The RACH configuration may indicate random access resources in a frequency spectrum. In addition, the RACH configuration may indicate random access sequences or information for generating random access sequences. In some implementations, certain random access sequences may be transmitted on certain physical random access channel (PRACH) resources.

At 506, when RCM capability is supported by the network, the UE 104 can establish a RCM connection with the network using an allocation of robust communication resources. For example, the UE 104 and the BS 102/180 may perform a frame exchange to establish the RCM connection on resources allocated for the robust communication between the UE 104 and the BS 102/180.

At 508, the BS 102/180 can transmit a NAI configuration to the UE 104 with validity information through the RCM connection over a downlink channel. In some aspects, the BS 102/180 may send the NAI configuration in a payload portion of a PDSCH transmission to the UE 104.

At 510, the UE 104 can process the NAI configuration and determine which feature capabilities to which the UE needs to update and the UE can update its capabilities with the NAI-based capabilities. For example, the NAI configuration may indicate features to which the UE 104 should disable in order to allow the UE 104 to access a wireless network upon an initial attach procedure. In other aspects, the NAI configuration may indicate a software upgrade patch for the UE 104 to download via the downlink channel and install locally. In this regard, the UE 104 may address any compatibility issues between the UE 104 and the BS 102/180.

Based on its new capabilities, the UE 104 can access the network through either a UE capability update procedure or an initial attach procedure. In some implementations, at 512, the UE 104 may optionally transmit a UE capability update message to the BS 102/180. The UE capability update message may indicate that the UE 104 has updated and/or modified one or more of its UE capabilities based on the NAI-based feature capabilities. In other implementations, the UE 104 may optionally transmit the UE capability update message following block 532 (but prior to block 534)

At 514, the UE 104 may transmit a PRACH signal based on the RACH configuration to initiate an access to the network. In some aspects, the UE 104 transmits a random access preamble on the PRACH. At 518, after transmitting the PRACH signal, the UE 104 may monitor for a random access response.

At 518, upon detecting the PRACH signal, the BS 102/180 processes the PRACH signal. For example, the BS 102/180 may monitor for a PRACH signal in the resources indicated in the configuration and based on the sequences indicated in the configuration. The BS 102/180 may determine uplink transmission timing of the UE 104 and assign a UL resource and a temporary identifier (ID) to the UE 104 for sending a subsequent message based on the received PRACH signal. The BS 102/180 may identify a next message (e.g., a connection request) from the UE 104 by the temporary ID.

At 520, the BS 102/180 transmits a random access response indicating the timing advance information, the uplink resource, and the temporary ID. After detecting the PRACH signal (or RACH message 1), the network (e.g., 5G NR gNB) may not be aware of the UE capability. In this regard, a legacy RACH message 2 can be sent to the UE no matter whether the UE has a high capability or a low capability to grant the same RACH message 3 resource.

At 522, upon receiving the random access response, the UE 104 processes the random access response. The UE 104 may obtain information associated with the UL resource, the temporary ID, and the timing advance information from the random access response.

At 524, the base station 102/180 may monitor for transmission of the RACH Msg 3 using a refined receive beam at the base station 102/180 as determined at 528.

At 526, the UE 104 transmits the RACH Msg 3 to the base station 102/180. In response to receiving the RACH Msg 2 PDSCH portion, the UE 104 transmits to the base station 102/180 a third message (e.g., RACH Msg 3), which may be an RRC connection request or a scheduling request, via a physical uplink channel such as PUSCH based on the RAR UL grant provided in the RACH Msg 2 of the base station 102/180.

At 528, the UE 104 may monitor for transmission of the RACH Msg 4 at the UE 104 as determined at 532. At 530, the base station 102/180 transmits the RACH Msg 4 to the UE 104.

At 531, the UE 104 receives the RACH Msg 4 PDSCH. In some aspects, the RACH Msg 4 includes PRI signaling that indicates a PUCCH resource. At 532, upon receipt of the RACH Msg 4 PDSCH, the UE 104 may transmit a RACH Msg 4 acknowledgment message using the PUCCH resource indicated by the PRI signaling in the downlink grant of the RACH Msg 4 PDSCH. Alternative to the implementation at step 526, the acknowledgment message to the RACH Msg 4 can carry an indication of the UE's updated capabilities based on the NAI-based capabilities.

At 534, the UE 104 transmits a connection request to the BS 102/180 based on an UL resource, a temporary ID, and/or timing advance information. In some aspects, the connection request may correspond to the RACH message 3. The UE 104 may communicate an indication of its UE capability. This indication may be in the form of a UE capability update. The UE capability update may correspond to information indicating the UE's updated capabilities relating to RCM such that the UE 104 can operate with updated NAI-based capabilities (e.g., software upgrade, disabled features, etc.) to minimize any adverse effects from compatibility issues between the UE 104 and BS 102/180. The UE 104 may transmit a RACH message 3 to indicate its capability so that the network (e.g., 5G NR gNB) can know the UE capability after detecting the RACH message 3. In other aspects, the UE 104 may transmit a RACH message A to indicate its capability.

At 516, upon receiving the connection request, the BS 102/180 processes the connection request. At 518, the BS 102/180 acknowledges the connection request by transmitting a connection response to the UE 104. In some aspects, the connection response may correspond to the RACH message 4. In this regard, the BS can indicate together with the RACH message 4 which PUCCH bandwidth to use. In other aspects, the connection response may correspond to a RACH message B, in which the BS can indicate together with the RACH message B which PUCCH bandwidth to use.

In the context of 5G NR, the temporary ID may be referred to as a temporary cell-radio network temporary identifier (C-RNTI). The PRACH signal, the random access response, the connection request, and the connection response may be referred to as message 1, message 2, message 3, and message 4, respectively.

Figure 6:
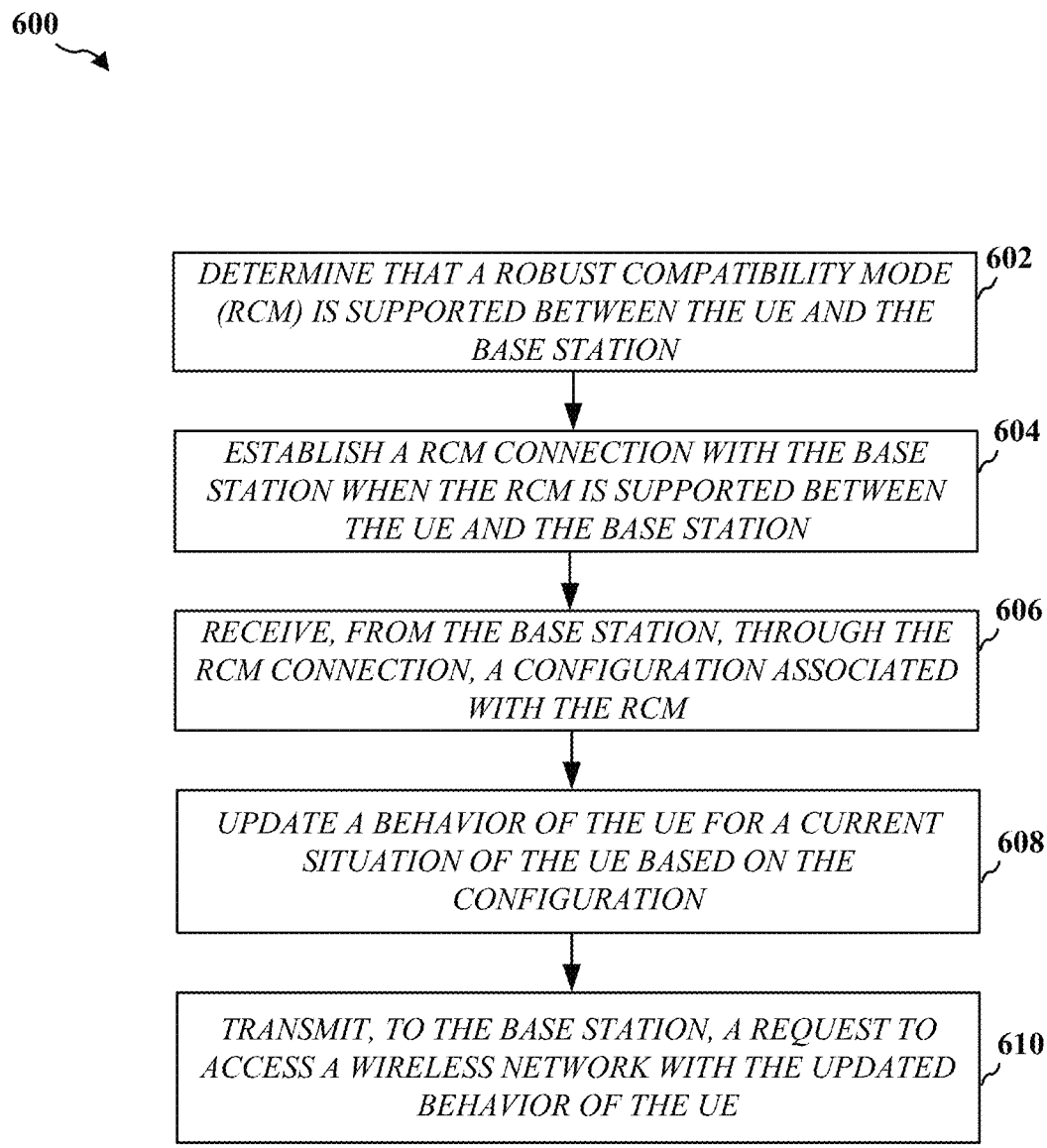
FIG. 6 is a flowchart of a process of wireless communication of a UE that facilitates a robust compatibility mode communication between a UE and network, in accordance with some aspects of the present disclosure.

FIG. 6 is a flowchart of a process 600 of wireless communication of a UE that facilitates a downlink control information format for indication of transmission configuration indication state. The process 600 may be performed by a UE (e.g., the UE 104; UE 350), which may include the memory 360 and which may be the entire UE or a component of the UE, such as the TX processor 368, the RX processor 356, and/or the controller/processor 359. As illustrated, the process 600 includes a number of enumerated steps, but implementations of the process 600 may include additional steps before, after, and in between the enumerated steps. In some implementations, one or more of the enumerated steps may be omitted or performed in a different order.

At 602, the UE may determine that a robust compatibility mode (RCM) is supported between the UE and a base station. The user equipment can determine that the RCM is supported, e.g., as described in connection with FIGS. 1-5. For instance, 602 may be performed by one or more components described with respect to FIG. 3, e.g., controller/processor 359, receive processor 356, transmit processor 368, receiver/transmitter 354 and/or antenna 352. The RCM support may be determined, e.g., by the RCM component 840 of the apparatus 802 in FIG. 8.

At 604, the UE may establish a RCM connection with the base station when the RCM is supported between the UE and the base station. The user equipment can establish the RCM connection, e.g., as described in connection with FIGS. 1-5. For instance, 604 may be performed by one or more components described with respect to FIG. 3, e.g., controller/processor 359, receive processor 356, transmit processor 368, receiver/transmitter 354 and/or antenna 352. The RCM connection may be established, e.g., by the RCM component 840 through coordination with the resource component 844 of the apparatus 802 in FIG. 8.

At 606, the UE may receive, from the base station, through the RCM connection, a configuration associated with the RCM. The user equipment can receive the configuration, e.g., as described in connection with FIGS. 1-5. For instance, 606 may be performed by one or more components described with respect to FIG. 3, e.g., controller/processor 359, receive processor 356, receiver/transmitter 354 and/or antenna 352. The configuration may be received, e.g., by the RCM component 840 and the configuration component 846 via the reception component 830 of the apparatus 802 in FIG. 8.

At 608, the UE may update a behavior of the UE for a current situation of the UE based on the configuration. The user equipment can update the UE behavior, e.g., as described in connection with FIGS. 1-5. For instance, 608 may be performed by one or more components described with respect to FIG. 3, e.g., controller/processor 359, receive processor 356, transmit processor 368, receiver/transmitter 354 and/or antenna 352. The UE behavior may be updated, e.g., by the RCM component 840 and the UE capability component 842 of the apparatus 802 in FIG. 8.

At 610, the UE may transmit, to the base station, a request to access a wireless network with the updated behavior of the UE. The user equipment can transmit the request for access to the wireless network, e.g., as described in connection with FIGS. 1-5. For instance, 610 may be performed by one or more components described with respect to FIG. 3, e.g., controller/processor 359, transmit processor 368, receiver/transmitter 354 and/or antenna 352. The request for access to the wireless network may be transmitted, e.g., by the RACH component 848 via the transmission component 834 of the apparatus 802 in FIG. 8.

Figure 7:
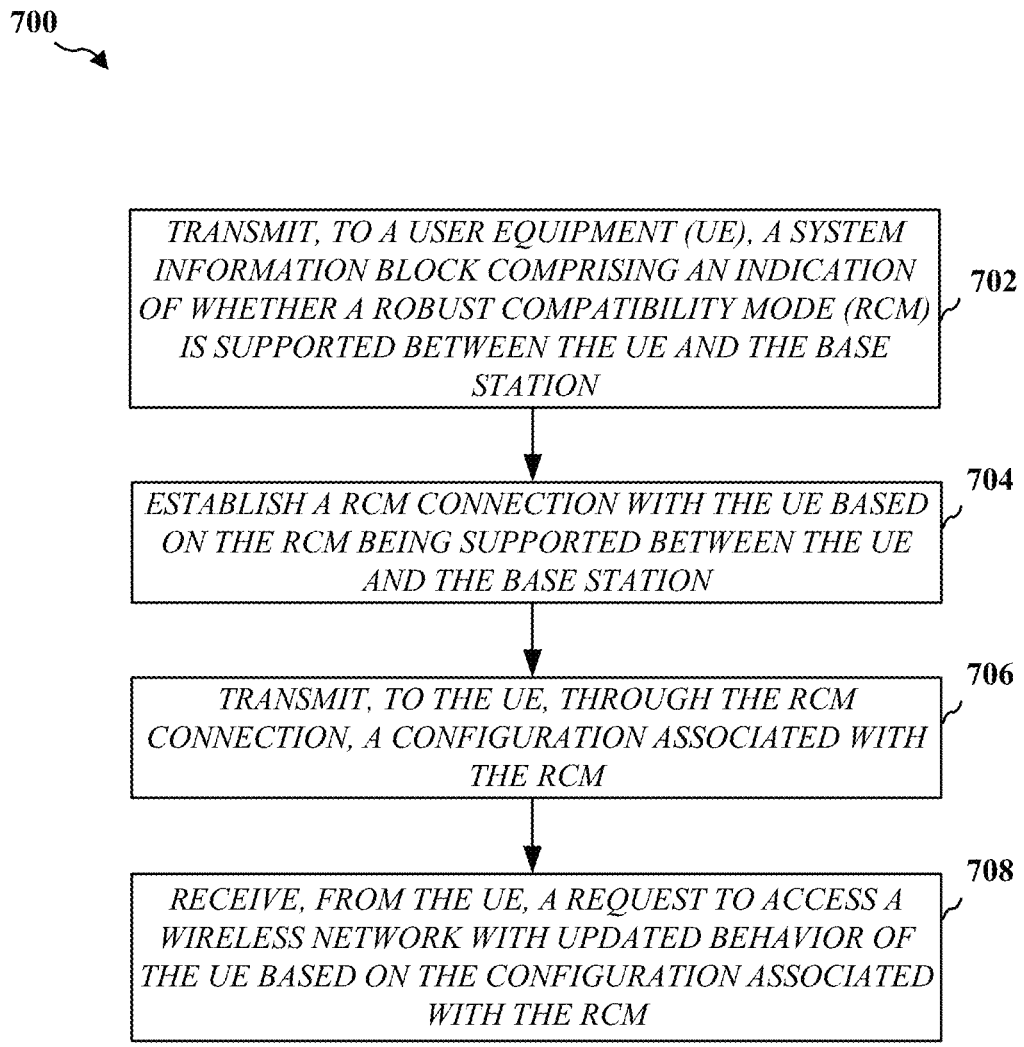
FIG. 7 is a flowchart of a process of wireless communication of a base station that configures a robust compatibility mode communication between a UE and network, in accordance with some aspects of the present disclosure.

FIG. 7 is a flowchart of a process 700 of wireless communication of a base station that configures a downlink control information format for indication of transmission configuration indication state. The process 700 may be performed by a cell (e.g., serving cell, non-serving cell) or a base station, which may include the memory 376 and which may be the entire base station or a component of the base station, such as the TX processor 316, the RX processor 370, and/or the controller/processor 375. As illustrated, the process 700 includes a number of enumerated steps, but implementations of the process 700 may include additional steps before, after, and in between the enumerated steps. In some implementations, one or more of the enumerated steps may be omitted or performed in a different order.

At 702, the base station may transmit, to a UE, a system information block comprising an indication of whether a robust compatibility mode (RCM) is supported between the UE and the base station. The base station can transmit the system information block, e.g., as described in connection with FIGS. 1-5. For instance, 702 may be performed by one or more components described with respect to FIG. 3, e.g., controller/processor 375, transmit processor 316, receiver/transmitter 318 and/or antenna 320. The system information block may be transmitted, e.g., by the system information component 942 through coordination with the RCM configuration component 940 via the transmission component 934 of the apparatus 902 in FIG. 9.

At 704, the base station may establish a RCM connection with the UE based on the RCM being supported between the UE and the base station. The base station can establish the RCM connection with the UE, e.g., as described in connection with FIGS. 1-5. For instance, 704 may be performed by one or more components described with respect to FIG. 3, e.g., controller/processor 375, receive processor 370, transmit processor 316, receiver/transmitter 318 and/or antenna 320. The RCM connection may be established, e.g., by the RCM configuration component 940 through coordination with the RCM resource allocation component 944 via the transmission component 934 of the apparatus 902 in FIG. 9.

At 706, the base station may transmit, to the UE, through the RCM connection, a configuration associated with the RCM. The base station can transmit the configuration, e.g., as described in connection with FIGS. 1-5. For instance, 706 may be performed by one or more components described with respect to FIG. 3, e.g., controller/processor 375, transmit processor 316, receiver/transmitter 318 and/or antenna 320. The configuration may be transmitted, e.g., by the RCM configuration component 940 through coordination with the RCM resource allocation component 944 via the transmission component 934 of the apparatus 902 in FIG. 9.

At 708, the base station may receive, from the UE, a request to access a wireless network with updated behavior of the UE based on the configuration associated with the RCM. The base station can receive the access request, e.g., as described in connection with FIGS. 1-5. For instance, 708 may be performed by one or more components described with respect to FIG. 3, e.g., controller/processor 375, receive processor 370, receiver/transmitter 318 and/or antenna 320. The UE request to access the wireless network may be received, e.g., by the RACH configuration component 946 via the reception component 930 of the apparatus 902 in FIG. 9.

Figure 8:
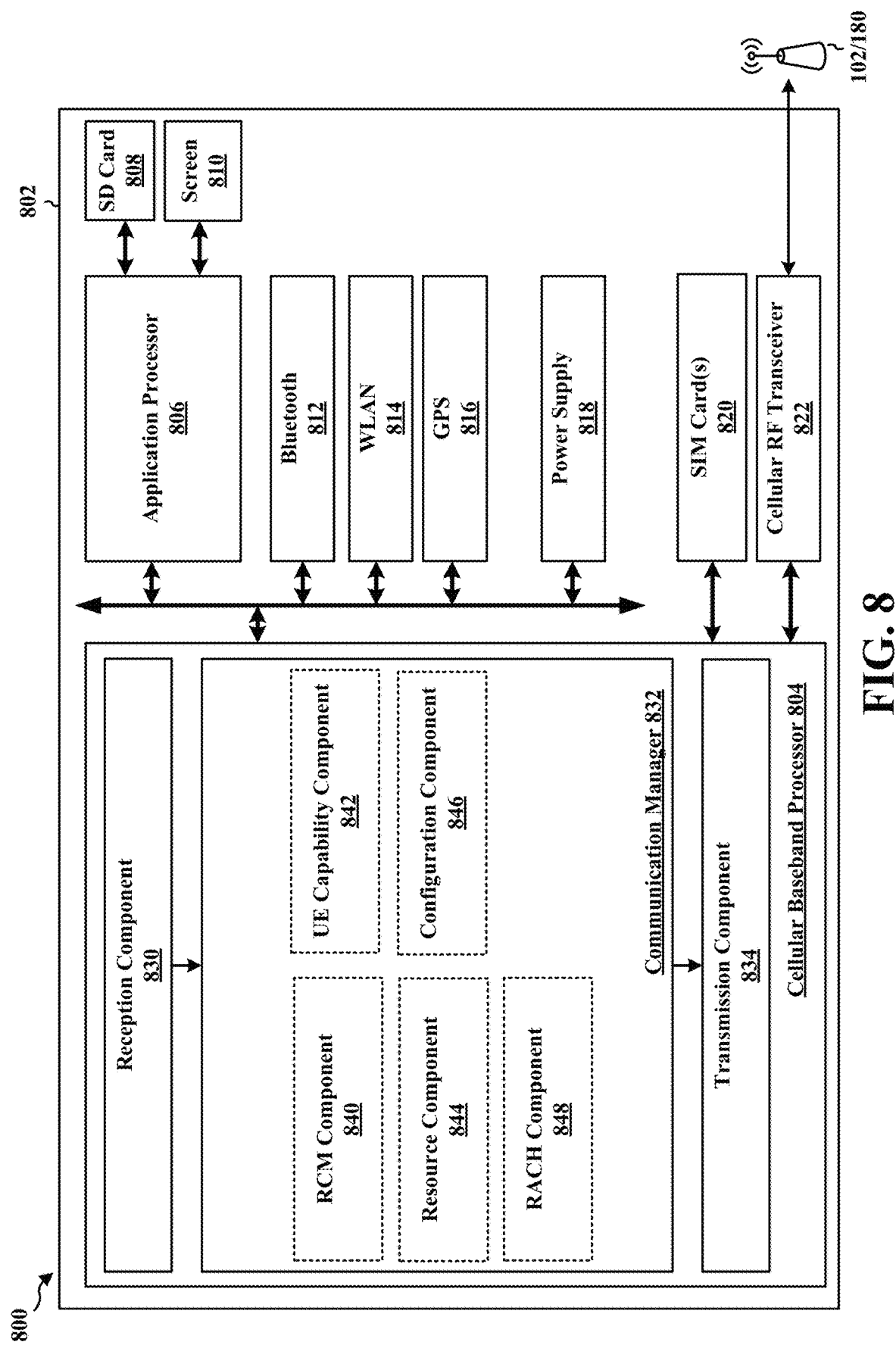
FIG. 8 is a diagram illustrating an example of a hardware implementation for an example apparatus at a UE.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more SIM cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software.

The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforementioned additional modules of the apparatus 802.

The communication manager 832 includes a RCM component 840 that determines that a robust compatibility mode (RCM) is supported between the UE and a base station, e.g., as described in reference to 602 of FIG. 6. The communication manager 832 further includes a UE capability component 842 that updates a behavior of the UE for a current situation of the UE based on the configuration, e.g., as described in reference to 608 of FIG. 6. The communication manager 832 further includes a resource component 844, through coordination with the RCM component 840, establishes a RCM connection with the base station when the RCM is supported between the UE and the base station, e.g., as described in reference to 604 of FIG. 6. The communication manager 832 further includes a configuration component 846 that receives, from the base station, through the RCM connection, a configuration associated with the RCM, e.g., as described in reference to 606 of FIG. 6. The communication manager 832 further includes a RACH component 848 that transmits, to the base station, a request to access a wireless network with the updated behavior of the UE, e.g., as described in reference to 602 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining whether a robust compatibility mode (RCM) is supported between the UE and the base station; means for establishing a RCM connection with the base station when the RCM is supported between the UE and the base station; means for receiving, from the base station, through the RCM connection, a configuration associated with the RCM; means for updating a behavior of the UE for a current situation of the UE based on the configuration; and means for transmitting, to the base station, a request to access a wireless network with the updated behavior of the UE. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
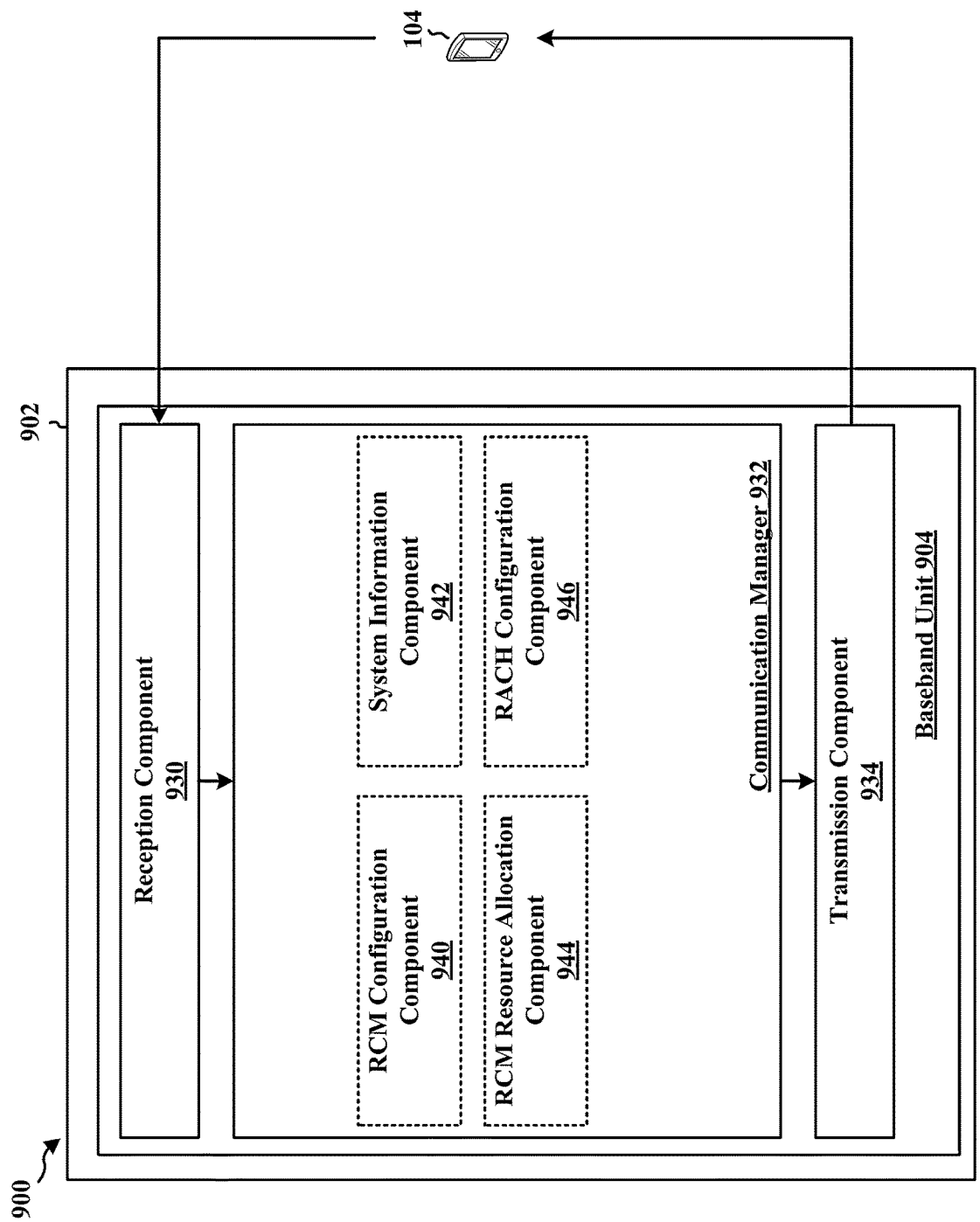
FIG. 9 is a diagram illustrating an example of a hardware implementation for an example apparatus at a base station.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a RCM configuration component 940 that transmits, to the UE, through the RCM connection, a configuration associated with the RCM, e.g., as described in reference to 706 of FIG. 7. The communication manager 932 further includes a system information component 942 that transmits, to a UE, a system information block comprising an indication of whether a robust compatibility mode (RCM) is supported between the UE and the base station, e.g., as described in reference to 702 of FIG. 7. The communication manager 932 further includes a RCM resource allocation component 944 that establishes, through coordination with the RCM configuration component 940, a RCM connection with the UE based on the RCM being supported between the UE and the base station, e.g., as described in reference to 704 of FIG. 7. The communication manager 932 further includes a RACH configuration component 946 that receives, from the UE, a request to access a wireless network with updated behavior of the UE based on the configuration associated with the RCM, e.g., as described in reference to 708 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a user equipment (UE), a system information block comprising an indication of whether a robust compatibility mode (RCM) is supported between the UE and the base station; means for establishing a RCM connection with the UE when the RCM is supported between the UE and the base station; means for transmitting, to the UE, through the RCM connection, a configuration associated with the RCM; and means for receiving, from the UE, a request to access a wireless network with updated behavior of the UE based on the configuration associated with the RCM. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with aspects of other embodiments or teachings described herein, without limitation.

Aspect 1 is a method of wireless communication at a user equipment (UE) that includes determining whether a robust compatibility mode (RCM) is supported between the UE and the base station; establishing a RCM connection with the base station when the RCM is supported between the UE and the base station; receiving, from the base station, through the RCM connection, a configuration associated with the RCM; updating a behavior of the UE for a current situation of the UE based on the configuration; and transmitting, to the base station, a request to access a wireless network with the updated behavior of the UE.

In Aspect 2, the method of Aspect 1 further includes receiving, from a base station, a system information block comprising an indication of whether the RCM is supported between the UE and the base station.

In Aspect 3, the method of Aspect 1 or Aspect 2 further includes decoding remaining minimum system information (RMSI) through the system information block; and determining, from the decoded RMSI, that the indication indicates that the RCM is supported between the UE and the base station.

In Aspect 4, the method of any of Aspects 1-3 further includes that the indication explicitly indicates an allocation of one or more robust communication resources (RCRs) for the RCM when the RCM is supported between the UE and the base station.

In Aspect 5, the method of any of Aspects 1-4 further includes that the indication indicates an available pool of robust communication resources associated (RCRs) for the RCM when the RCM is supported between the UE and the base station, further comprising selecting one or more specific robust communication resources from the available pool of robust communication resources.

In Aspect 6, the method of any of Aspects 1-5 further includes that the configuration comprises a network assistance information (NAI) information element indicating one or more NAI-based feature set capabilities to which the UE is to update in a current situation of the UE and to initiate access with the wireless network or resume access with the wireless network.

In Aspect 7, the method of any of Aspects 1-6 further includes that the updating the behavior of the UE comprises updating one or more feature set capabilities of the UE according to the one or more NAI-based feature set capabilities included in the NAI information element of the configuration.

In Aspect 8, the method of any of Aspects 1-7 further includes that the updating the one or more feature set capabilities of the UE comprises disabling the one or more feature set capabilities of the UE based on the current situation of the UE that alters the behavior of the UE to successfully access the wireless network.

In Aspect 9, the method of any of Aspects 1-8 further includes that the behavior of the UE is updated based on the configuration for a non-permanent duration until a disablement of the one or more feature set capabilities of the UE is removed.

In Aspect 10, the method of any of Aspects 1-9 further includes that the behavior of the UE is updated based on the configuration for a permanent duration.

In Aspect 11, the method of any of Aspects 1-10 further includes transmitting, to the base station, a UE capability update message indicating the updated one or more feature set capabilities of the UE according to the one or more NAI-based feature set capabilities included in the NAI information element of the configuration.

In Aspect 12, the method of any of Aspects 1-11 further includes that the NAI-based feature set capabilities are specific to one of a radio access technology (RAT), a cell, timing advance (TA), public land mobile network (PLMN) or a network operator.

Aspect 13 is a device including one or more processors and one or more memories in electronic communication with the one or more processors storing instructions executable by the one or more processors to cause a system or an apparatus to implement a method as in any of Aspects 1 to 12.

Aspect 14 is a system or apparatus including means for implementing a method or realizing an apparatus as in any of Aspects 1 to 12.

Aspect 15 is a non-transitory computer-readable medium storing instructions executable by one or more processors to cause the one or more processors to implement a method as in any of Aspects 1 to 12.

Aspect 16 is a method of wireless communication at a base station that includes transmitting, to a user equipment (UE), a system information block comprising an indication of whether a robust compatibility mode (RCM) is supported between the UE and the base station; establishing a RCM connection with the UE when the RCM is supported between the UE and the base station; transmitting, to the UE, through the RCM connection, a configuration associated with the RCM; and receiving, from the UE, a request to access a wireless network with updated behavior of the UE based on the configuration associated with the RCM.

In Aspect 17, the method of Aspect 16 further includes that the configuration comprises a network assistance information (NAI) information element indicating one or more NAI-based feature set capabilities to which the UE is to update in a current situation of the UE and to initiate access with a wireless network or resume access with the wireless network.

In Aspect 18, the method of Aspect 17 further includes receiving, from the UE, a UE capability update message indicating the updated one or more feature set capabilities of the UE according to the one or more NAI-based feature set capabilities included in the NAI information element of the configuration.

Aspect 19 is a device including one or more processors and one or more memories in electronic communication with the one or more processors storing instructions executable by the one or more processors to cause a system or an apparatus to implement a method as in any of Aspects 16 to 18.

Aspect 20 is a system or apparatus including means for implementing a method or realizing an apparatus as in any of Aspects 16 to 18.

Aspect 21 is a non-transitory computer-readable medium storing instructions executable by one or more processors to cause the one or more processors to implement a method as in any of Aspects 16 to 18.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), the method comprising:
   determining, based on an indication in system information, whether a robust compatibility mode (RCM) is supported between the UE and a base station;
   establishing a RCM connection with the base station when the RCM is supported between the UE and the base station;
   receiving, from the base station, through the RCM connection, a configuration associated with the RCM;
   updating a behavior of the UE for a current situation of the UE based on the configuration; and
   transmitting, to the base station, a request in a random access channel (RACH) message to access a wireless network with the updated behavior of the UE, the RACH message being transmitted after the RCM connection is established and after the configuration associated with the RCM is received, the configuration including a network assistance information (NAI) information element indicating one or more NAI-based feature set capabilities to which the UE is to update in the current situation of the UE.

2. The method of claim 1, further comprising receiving, from the base station, a system information block comprising the indication of whether the RCM is supported between the UE and the base station.

3. The method of claim 2, further comprising:
   decoding remaining minimum system information (RMSI) through the system information block; and
   determining, from the decoded RMSI, that the indication indicates that the RCM is supported between the UE and the base station.

4. The method of claim 2, wherein the indication explicitly indicates an allocation of one or more robust communication resources (RCRs) for the RCM when the RCM is supported between the UE and the base station.

5. The method of claim 2, wherein the indication indicates an available pool of robust communication resources (RCRs) for the RCM when the RCM is supported between the UE and the base station, further comprising selecting one or more specific robust communication resources from the available pool of robust communication resources.

6. The method of claim 1, wherein updating the behavior of the UE comprises updating one or more feature set capabilities of the UE according to the one or more NAI-based feature set capabilities included in the NAI information element of the configuration.

7. The method of claim 6, wherein the updating the one or more feature set capabilities of the UE comprises disabling the one or more feature set capabilities of the UE based on the current situation of the UE that alters the behavior of the UE to successfully access the wireless network.

8. The method of claim 7, wherein the behavior of the UE is updated based on the configuration for a non-permanent duration until a disablement of the one or more feature set capabilities of the UE is removed.

9. The method of claim 6, wherein the behavior of the UE is updated based on the configuration for a permanent duration.

10. The method of claim 6, further comprising transmitting, to the base station, a UE capability update message indicating the updated one or more feature set capabilities of the UE according to the one or more NAI-based feature set capabilities included in the NAI information element of the configuration.

11. The method of claim 1, wherein the NAI-based feature set capabilities are specific to one of a radio access technology (RAT), a cell, timing advance (TA), public land mobile network (PLMN) or a network operator.

12. An apparatus of wireless communication at a user equipment (UE), the apparatus comprising:
   a transceiver;
   at least one processor; and
   one or more memories, coupled to the at least one processor and the transceiver, having computer executable code stored thereon, the code which when executed by the at least one processor individually or in combination, causes the apparatus to:
      determine, based on an indication in system information, whether a robust compatibility mode (RCM) is supported between the UE and a base station;
      establish a RCM connection with the base station when the RCM is supported between the UE and the base station;
      receive, from the base station, through the RCM connection, a configuration associated with the RCM;
      update a behavior of the UE for a current situation of the UE based on the configuration; and
      transmit, to the base station, a request in a random access channel (RACH) message to access a wireless network with the updated behavior of the UE, the RACH message being transmitted after the RCM connection is established and after the configuration associated with the RCM is received, the configuration including a network assistance information (NAI) information element indicating one or more NAI-based feature set capabilities to which the UE is to update in the current situation of the UE.

13. The apparatus of claim 12, wherein the code, which when executed by the at least one processor, further causes the apparatus to receive, from the base station, a system information block comprising the indication of whether the RCM is supported between the UE and the base station.

14. The apparatus of claim 13, wherein the code, which when executed by the at least one processor, further causes the apparatus to:
decode remaining minimum system information (RMSI) through the system information block; and
determine, from the decoded RMSI, that the indication indicates that the RCM is supported between the UE and the base station.

15. The apparatus of claim 13, wherein the indication explicitly indicates an allocation of one or more robust communication resources (RCRs) for the RCM when the RCM is supported between the UE and the base station.

16. The apparatus of claim 13, wherein the indication indicates an available pool of robust communication resources (RCRs) for the RCM when the RCM is supported between the UE and the base station, and the code, when executed by the at least one processor, further causes the apparatus to select one or more specific robust communication resources from the available pool of robust communication resources.

17. The apparatus of claim 12, wherein updating the behavior of the UE comprises to update one or more feature set capabilities of the UE according to the one or more NAI-based feature set capabilities included in the NAI information element of the configuration.

18. The apparatus of claim 17, wherein the updating the one or more feature set capabilities of the UE comprises to disable the one or more feature set capabilities of the UE based on the current situation of the UE that alters the behavior of the UE to successfully access the wireless network.

19. The apparatus of claim 18, wherein the behavior of the UE is updated based on the configuration for a non-permanent duration until a disablement of the one or more feature set capabilities of the UE is removed.

20. The apparatus of claim 17, wherein the behavior of the UE is updated based on the configuration for a permanent duration.

21. The apparatus of claim 17, wherein the code, which when executed by the at least one processor, further causes the apparatus to transmit, to the base station, a UE capability update message indicating the updated one or more feature set capabilities of the UE according to the one or more NAI-based feature set capabilities included in the NAI information element of the configuration.

22. The apparatus of claim 12, wherein the NAI-based feature set capabilities are specific to one of a radio access technology (RAT), a cell, timing advance (TA), public land mobile network (PLMN) or a network operator.

23. A method of wireless communication at a base station, the method comprising:
transmitting, to a user equipment (UE), a system information block comprising an indication of whether a robust compatibility mode (RCM) is supported between the UE and the base station;
establishing a RCM connection with the UE when the RCM is supported between the UE and the base station;
transmitting, to the UE, through the RCM connection, a configuration associated with the RCM; and
receiving, from the UE, a request in a random access channel (RACH) message to access a wireless network with updated behavior of the UE based on the configuration associated with the RCM, the RACH message being received after the RCM connection is established and after the configuration associated with the RCM is transmitted, the configuration including a network assistance information (NAI) information element indicating one or more NAI-based feature set capabilities to which the UE is to update in a current situation of the UE.

24. The method of claim 23, further comprising receiving, from the UE, a UE capability update message indicating an update to one or more feature set capabilities of the UE according to the one or more NAI-based feature set capabilities included in the NAI information element of the configuration.

25. An apparatus for wireless communication at a base station, the apparatus comprising:
a transceiver;
at least one processor; and
one or more memories, coupled to the at least one processor and the transceiver, having computer executable code stored thereon, the code which when executed by the at least one processor individually or in combination, causes the apparatus to:
transmit, to a user equipment (UE), a system information block comprising an indication of whether a robust compatibility mode (RCM) is supported between the UE and the base station;
establish a RCM connection with the UE when the RCM is supported between the UE and the base station;
transmit, to the UE, through the RCM connection, a configuration associated with the RCM; and
receive, from the UE, a request in a random access channel (RACH) message to access a wireless network with updated behavior of the UE based on the configuration associated with the RCM, the RACH message being received after the RCM connection is established and after the configuration associated with the RCM is transmitted, the configuration including a network assistance information (NAI) information element indicating one or more NAI-based feature set capabilities to which the UE is to update in a current situation of the UE.

26. The apparatus of claim 25, wherein the code, which when executed by the at least one processor, further causes the apparatus to receive, from the UE, a UE capability update message indicating an update to one or more feature set capabilities of the UE according to the one or more NAI-based feature set capabilities included in the NAI information element of the configuration.

* * * * *